United States Patent [19]

Kerns et al.

[11] Patent Number: 4,751,938
[45] Date of Patent: Jun. 21, 1988

[54] APPARATUS FOR SUPPORTING STRUCTURE BETWEEN BOLTED FLANGES

[75] Inventors: Roy L. Kerns, Tulsa; John L. Strelow, Broken Arrow, both of Okla.

[73] Assignee: BS&B Safety Systems, Inc., Tulsa, Okla.

[21] Appl. No.: 304,792

[22] Filed: Sep. 23, 1981

[51] Int. Cl.[4] ........................ F16K 17/16; F16L 23/02; F17B 1/14

[52] U.S. Cl. .................................. 137/68.1; 251/148; 251/152; 220/89 A; 220/207; 285/31; 285/363

[58] Field of Search ............. 137/68 R; 251/148, 152; 285/305, 363, 368, 412

[56] References Cited

U.S. PATENT DOCUMENTS 3,074,427  1/1963  Wheeler .......................... 285/363 X
3,346,005  10/1967 Hanssen ........................... 251/148 X
3,781,043  12/1973 Hagmann ......................... 285/363
4,073,402  2/1978  Wood ............................... 137/68 R Primary Examiner—Martin P. Schwadron
Attorney, Agent, or Firm—Laney, Dougherty, Hessin & Beavers

[57] ABSTRACT

Structure supporting apparatus which for a particular nominal size can be interchangeably sealingly clamped and centered between bolted flanges of varying pressure rating and design standard. The apparatus includes at least one support member having opposite parallel sides for sealingly engaging the seating surfaces of the flanges, a centrally positioned opening extending through the member and through the sides thereof for positioning structure supported thereby in alignment with the flow passageways in the flanges, the periphery of the support member being substantially square shape and including a pair of spaced apart recesses disposed in each of the four sides forming the substantially square shaped periphery thereof.

12 Claims, 6 Drawing Sheets

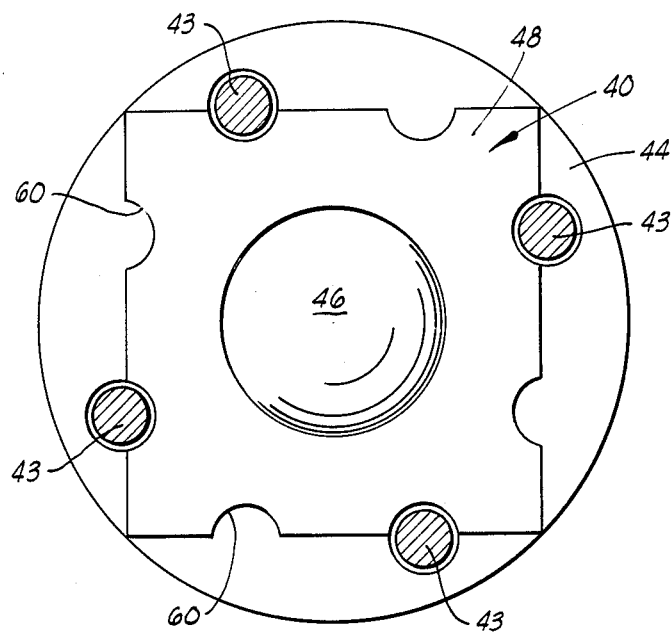
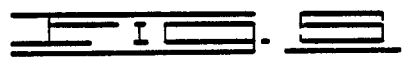
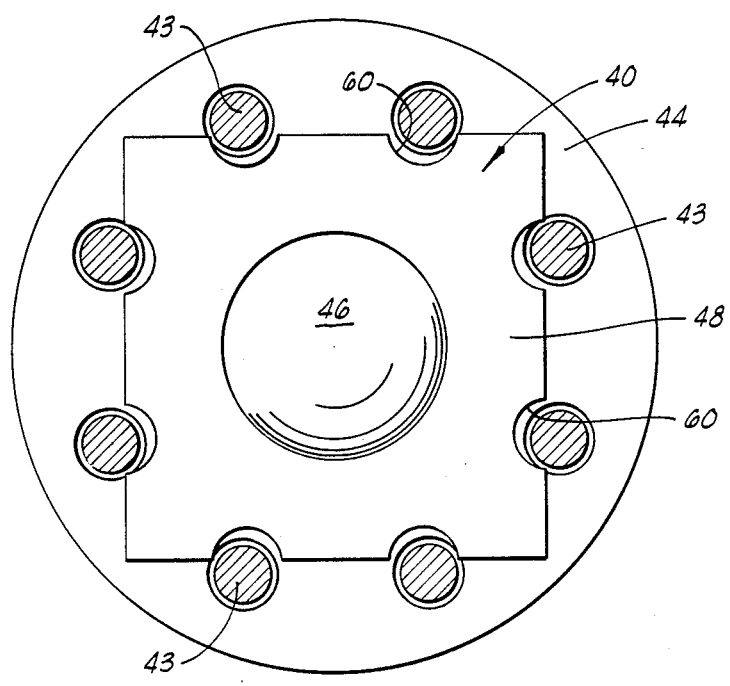
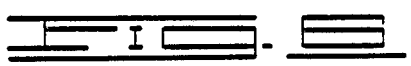

APPARATUS FOR SUPPORTING STRUCTURE BETWEEN BOLTED FLANGES

BACKGROUND OF THE INVENTION

1. Field of the Invention

The present invention relates generally to apparatus for supporting structure between bolted flanges, and more particularly, but not by way of limitation, to structure supporting apparatus which, in a particular nominal size, can be interchangeably sealingly clamped and centered between bolted flanges of varying pressure rating and design standard.

2. Description of the Prior Art

A great variety of apparatus adapted to be clamped between bolted flanges has been developed and used heretofore. For example, a variety of valves such as check valves, ball valves, butterfly valves and other valves have been developed which can be clamped between bolted flanges. In addition, a variety of rupture disk assemblies which are adapted for clamping between pipe flanges have been developed and used heretofore. Such valves and rupture disk assemblies are generally of a size and shape such that they fit inside the bolt circle of conventional pipe flanges and are centered between the flanges by the bolts. For example, U.S. Pat. No. 4,073,402 issued to Wood on Feb. 14, 1978 is directed to a preassembled pressure relief apparatus. The apparatus is comprised of a rupture disk supported between a pair of complementary support members, and the support members are of a size and shape such that they can be clamped between conventional pipe flanges.

U.S. Pat. No. 3,526,336 issued to Wood on Sept. 1, 1970 is directed to a reverse rupture disk supported between inlet and outlet support members. The support members are in turn adapted to be clamped between pipe flanges.

U.S. Pat. No. 3,815,779 issued to Ludwig et al. on June 11, 1974 is directed to a safety pressure relief device comprised of a rupture disk supported between a pair of annular support members adapted to be clamped between conventional pipe flanges. One of the support members includes an annular spacing member attached to the outside periphery thereof so that when the safety pressure relief device is clamped between the pipe flanges, the device is automatically centered therein.

Some of the valves, rupture disk assemblies and other similar devices adapted for clamping between conventional pipe flanges are of a design such that in a particular nominal size they can be interchangeably clamped between bolted flanges of the same nominal size of varying pressure rating. For example, the preassembled pressure relief apparatus described in U.S. Pat. No. 4,073,402 can be clamped between flanges of various pressure ratings, e.g., a preassembled pressure relief apparatus of a 6-inch nominal size can be clamped between 6-inch, 150 pound per square inch ASA raised face flanges and 6-inch, 300 pound per square inch ASA raised face flanges.

As is well understood by those skilled in the art, in the U.S. conventional pipe flanges are constructed in accordance with standards provided by the American National Standards Institute (ANSI). In a particular nominal size, the bolt circles and numbers of bolts used in the flanges change with changes in pressure rating. For example, a 2-inch, 150 pound per square inch flange has a bolt circle of 4.75 inches in diameter and 4 bolt holes while a 2-inch, 300 pound per square inch flange has a bolt circle of 5 inches in diameter with 8 bolt holes. In other countries, different standards are used, the most common of which are the German Industrial Norm (DIN) and the Japanese Industrial Standard (JIS). These design standards are different from the American standards and from each other, i.e., each standard utilizes different diameter bolt circles and numbers of bolts, and the bolt circles and numbers of bolt holes vary with different pressure ratings and nominal size. Thus, heretofore, structure supporting apparatus adapted to be clamped between conventional bolted flanges and centered therein by contact with the bolts can be interchangeably clamped between only a limited number of bolted flanges of varying pressure rating and/or design standard. That is, a structure supporting apparatus adapted to be clamped between a particular nominal size of ANSI flanges and centered therein by contact with the bolts cannot be interchangeably clamped between and centered in the same nominal size of flanges built in accordance with the DIN or JIS standards.

By the present invention, improved apparatus for supporting structure between bolted flanges is provided which in a particular nominal size can be interchangeably sealingly clamped and centered between bolted flanges of varying pressure rating and design standard.

SUMMARY OF THE INVENTION

A structure supporting apparatus which can be interchangeably sealingly clamped and centered between bolted flanges of varying pressure rating and design standard, the flanges including complementary centrally positioned flow passageways and annular seating surfaces comprising at least one support member having flat opposite parallel sides for sealingly engaging the seating surfaces of the flanges, a centrally positioned opening extending through the support member and through the flat parallel sides thereof for positioning structure supported by the support member in alignment with the flow passageways of the flanges, the periphery of the support member being substantially square shaped and including a pair of spaced apart rounded recesses disposed in each of the four sides forming the substantially square shaped periphery thereof.

It therefore, a general object of the present invention to provide an improved apparatus for supporting structure between bolted flanges.

A further object of the present invention is the provision of structure supporting apparatus which can be interchangeably sealingly clamped and centered between bolted flanges of varying pressure rating and design standard.

Yet a further object of the present invention is the provision of pressure relief apparatus which can be interchangeably sealingly clamped and centered between bolted flanges of varying pressure rating and design standard.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 5 illustrates the position of the apparatus of the present invention when clamped between 2-inch, 150 pound/square inch flanges made in accordance with ANSI standards.

FIG. 6 illustrates the position of the apparatus of the present invention when clamped between 2-inch, 300 pound/square inch and 600 pound/square inch flanges made in accordance with ANSI standards.

DESCRIPTION OF PREFERRED EMBODIMENTS

Figure 1:
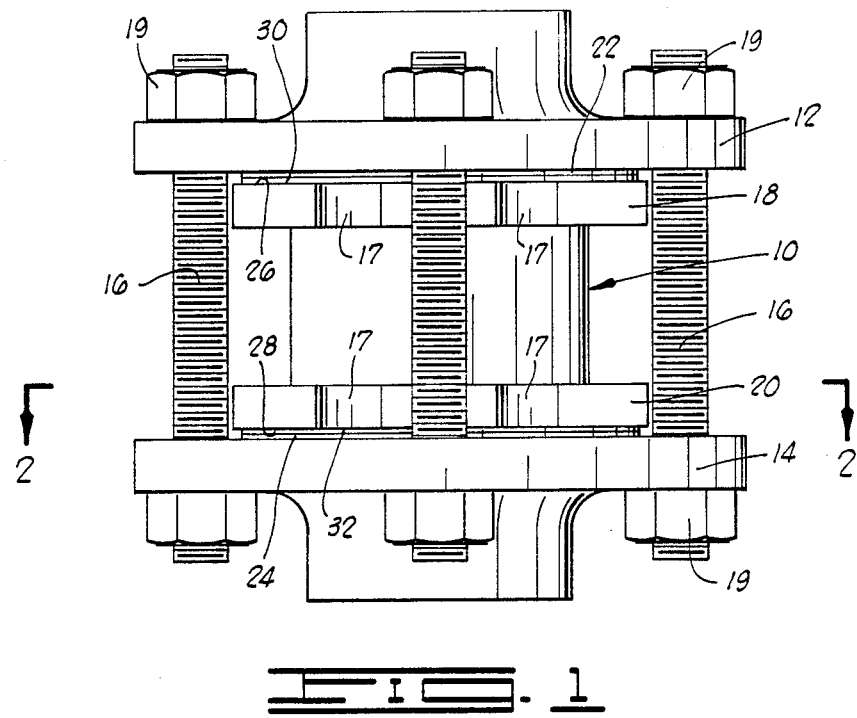
FIG. 1 is a side elevational view of a structure including the structure supporting apparatus of the present invention clamped between a pair of conventional bolted flanges.
Figure 2:
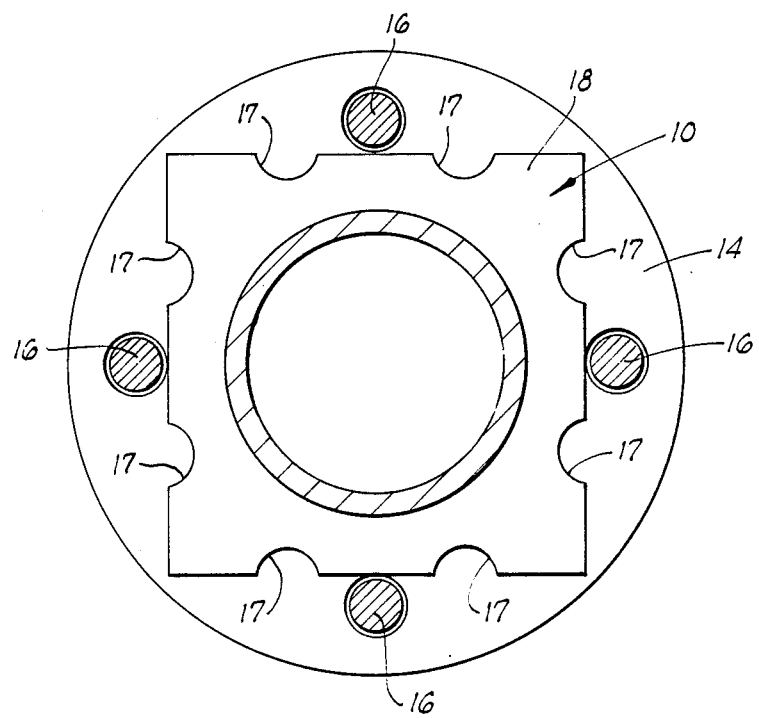
FIG. 2 is a cross-sectional view taken along line 2—2 of FIG. 1.

Referring now to the drawings and particularly to FIGS. 1 and 2, a device such as a valve including the structure supporting apparatus of the present invention, generally designated by the numeral 10, is illustrated sealingly clamped between a pair of bolted flanges 12 and 14. The flanges 12 and 14 include complementary bolt holes and a plurality of bolts or studs 16 and nuts 19 are utilized to sealingly clamp the apparatus 10 between the flanges 12 and 14. Each of the flanges 12 and 14 includes centrally positioned flow passageways therein. The device 10 includes structure supporting apparatus of a size and shape such that it is centered between the flanges 12 and 14 and aligned with the flow passageways in the flanges 12 and 14 by the studs 16. That is, the device 10 includes a pair of integral complementary support members 18 and 20 attached to opposite ends thereof adjacent the flanges 12 and 14. The flanges 12 and 14 include raised face seating surfaces 22 and 24 and the support members 18 and 20 include falt seating surfaces 26 and 28 for sealing engagement with the seating surfaces 22 and 24 of the flanges 12 and 14. A pair of gaskets 30 and 32 are clamped between the seating surfaces 22 and 26 and 28 and 32, respectively, for insuring a seal therebetween.

Figure 3:
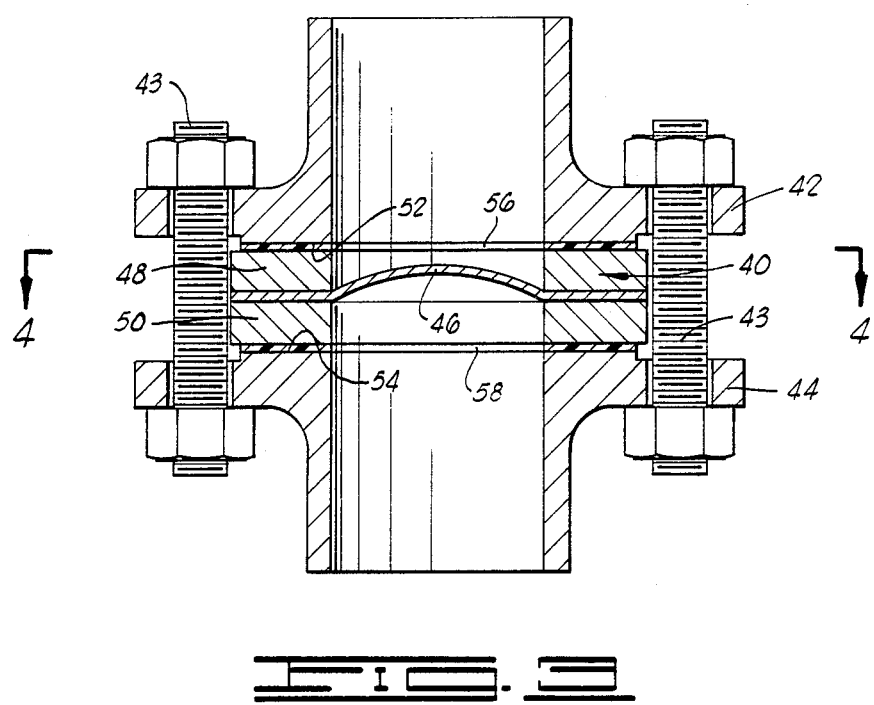
FIG. 3 is a side cross-sectional view of a pressure relief device including the structure supporting apparatus of the present invention clamped between a pair of conventional bolted flanges.
Figure 4:
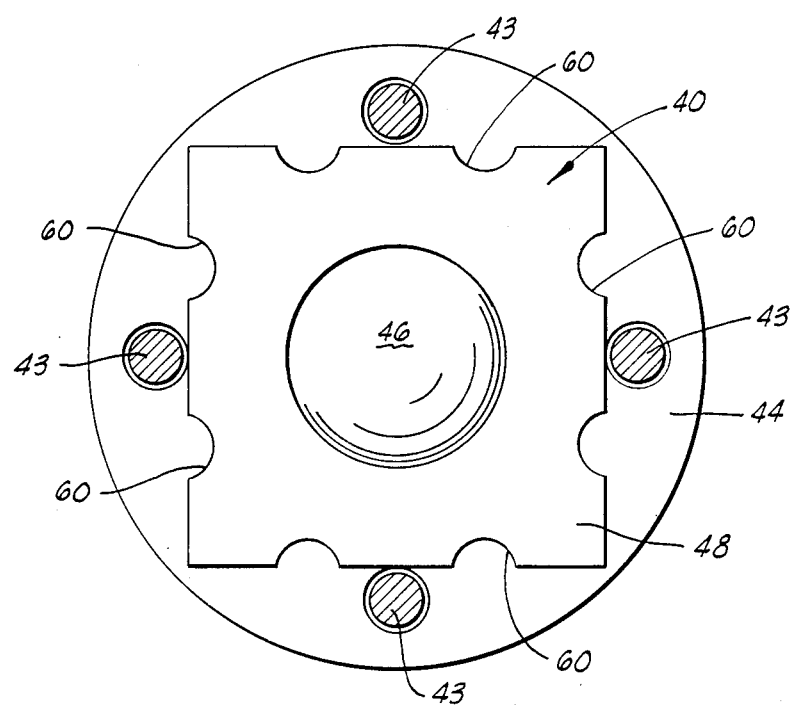
FIG. 4 is a cross-sectional view taken along line 4—4 of FIG. 2 illustrating the position of the apparatus of the invention when clamped between 2-inch, 10, 16, 25 and 40 kilogram force/square centimeter flanges made in accordance with DIN standards.

Referring now to FIGS. 3 and 4, a pressure relief device including the structure supporting apparatus of the present invention, generally designated by the numeral 40, is illustrated clamped between a pair of conventional pipe flanges 42 and 44 by studs 43 and nuts 45. The pressure relief device 40 is comprised of a rupture disk 46 clamped between structure supporting apparatus of this invention, i.e., between support members 48 and 50. The support members 48 and 50 each have flat opposite parallel sides for sealingly engaging raised face seating surfaces 52 and 54 on the flanges 42 and 44. Gaskets 56 and 58 are disposed between the support members 48 and 50 and the seating surfaces 52 and 54 of the flanges 42 and 44 for providing a fluid-tight seal therebetween. Each of the support members 48 and 50 includes a central circular opening therein whereby the rupture disk 46 is positioned in alignment with and across the flow passageways of the flanges 42 and 44.

As shown in FIGS. 2 and 4, the peripheries of the support members 18 and 20 of the device 10 and the support members 48 and 50 of the device 40 are identical and are of substantially square shape. In addition, each of the support members 18, 20, 48 and 50 includes a pair of spaced apart rounded recesses 17 and 60, respectively, disposed in each of the four sides forming the square shaped periphery thereof. The support members 18, 20, 48 and 50 are of a size such that the studs 16 and 43 center the devices 10 and 40 when the support members are positioned in the flanges as shown in FIGS. 1-4.

The configurations of the peripheries of the support members 18, 20, 48 and 50 allow the devices 10 and 40 to be interchangeably sealingly clamped and centered between bolted flanges of various pressure rating and design standard. More particularly, in nominal sizes of 1, 1½ and 2 inches, the support members can interchangeably be installed in corresponding nominal sizes of 150, 300 and 600 pounds/square inch ANSI flanges; 10, 16, 25 and 40 kilogram-force/square centimeter DIN flanges; and 10, 16, 20, 30 and 40 kilogram-force/square centimeter JIS flanges. In larger nominal sizes, e.g., 3 and 4 inches, the support members can be interchangeably installed in some but not all of the above-mentioned flanges of corresponding nominal size. The interchangeability of the structure supporting apparatus of this invention in nominal sizes of 1 inch through 4 inches is shown in Table I below wherein a "yes" indicates that the apparatus can be clamped and centered in the indicated flanges and "no" means that the apparatus cannot be clamped and/or centered therein.

TABLE I

| | INTERCHANGEABILITY OF STRUCTURE SUPPORTING APPARATUS | | | | | | | | | | | |
|---|---|---|---|---|---|---|---|---|---|---|---|---|
| | ANSI (American National Standards Institute) | | | DIN (German Industrial Norm) | | | | JIS (Japanese Industrial Standard) | | | | |
| Nominal Size | 150 psi | 300 psi | 600 psi | 10 kgf/cm² | 16 kgf/cm² | 25 kgf/cm² | 40 kgf/cm² | 10 kgf/cm² | 16 kgf/cm² | 20 kgf/cm² | 30 kgf/cm² | 40 kgf/cm² |
| 1 inch (25 mm) | yes | yes | yes | yes | yes | yes | yes | yes | yes | yes | yes | yes |
| 1½ in (40 mm) | yes | yes | yes | yes | yes | yes | yes | yes | yes | yes | yes | yes |
| 2 inch (50 mm) | yes | yes | yes | yes | yes | yes | yes | yes | yes | yes | yes | yes |
| 3 inch (80 mm) | yes | yes | yes | yes | yes | yes | yes | no | yes | yes | yes | yes |
| 4 inch (100 mm) | yes | yes | no | yes | yes | no | no | no | yes | yes | yes | yes |

Figure 7:
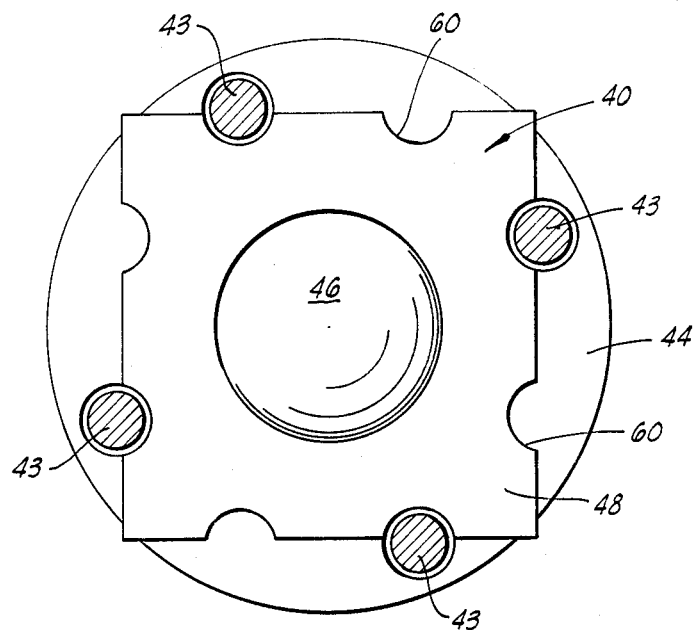
FIG. 7 illustrates the position of the apparatus of the present invention when clamped between 2-inch, 10 kilogram-force/square centimeter flanges made in accordance with JIS standards.
Figure 8:
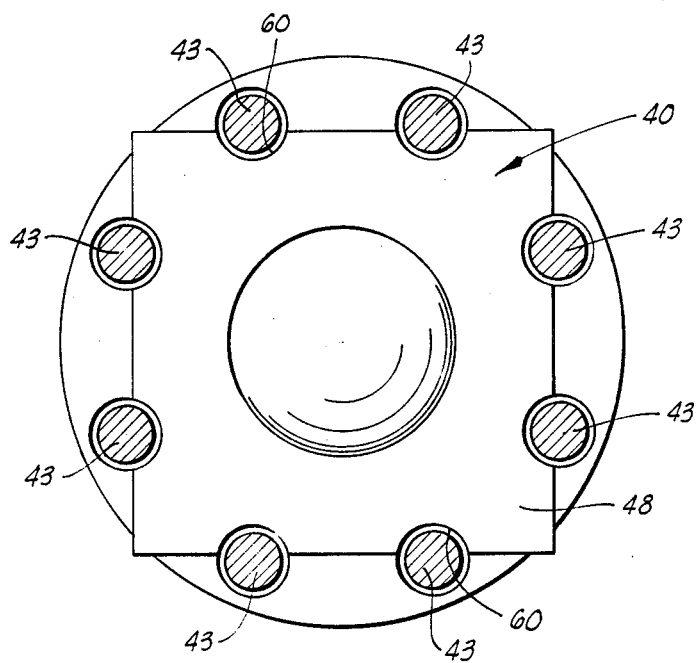
FIG. 8 illustrates the position of the apparatus of the present invention when clamped between 2-inch, 15 and 20 kilogram-force/square centimeter flanges made in accordance with JIS standards.
Figure 9:
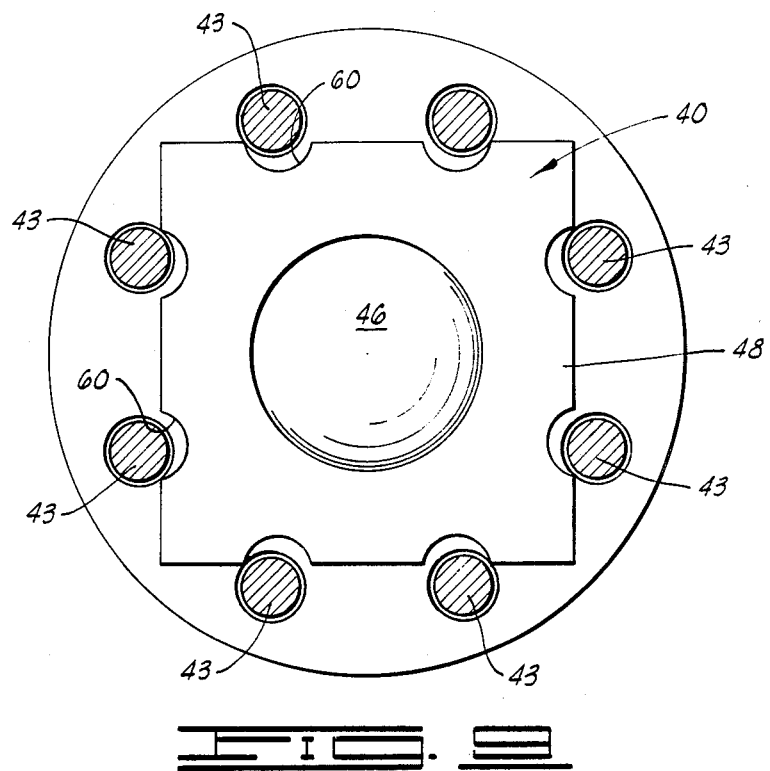
FIG. 9 illustrates the position of the apparatus of the present invention whem clamped between 2-inch, 30 and 40 kilogram-force/square centimeter flanges made in accordance with JIS standards.

In order to center the structure supporting apparatus of this invention in flanges of a particular nominal size but varying in pressure rating and design standard, the apparatus is positioned with the bolts or studs of the flanges either abutting the sides of the apparatus, or fitted partially or wholly into the rounded recesses thereof. For example, in a 2-inch (50 mm) nominal size, the sides of the support members 48 and 50 of the device 40 are each 105 mm±5 mm long. The rounded recesses in the sides of the support members 48 and 50 correspond to portions of 19 mm±5 mm circles, the centers of which are on a circle having a diameter of 120 mm±5 mm. When installed in 2-inch, 10, 16, 25 and 40 kilogram-force/square centimeter DIN flanges, the support members 48 and 50 of the device 40 are positioned as shown in FIGS. 2 and 4, i.e., with the studs 43 abutting the central areas of the sides of the support members. When installed in 2-inch, 150 pound/square inch ANSI flanges, the device 40 is positioned as shown in FIG. 5, i.e., with the four studs 43 of the flanges fitted into four of the rounded recesses 60 of the support members 48 and 50. When the flanges 42 and 44 are 2-inch, 300 pound/square inch or 600 pound/square inch ANSI flanges, the device 40 is positioned as shown in FIG. 6 whereby the eight studs 43 of the flanges are partially within the rounded recesses 60 of the support members 48 and 50. When the flanges 42 and 44 are 2-inch, 10 kilogram-force/square centimeter JIS flanges, the device 40 is positioned as shown in FIG. 7, i.e., with the four studs 43 fitted into four of the rounded recesses 60 of the support members 48 and 50. When the flanges 42 and 44 are 2-inch, 16 and 20 kilogram-force/square centimeter JIS flanges, the device 40 is positioned as shown in FIG. 8, i.e., whereby the eight studs 43 are fitted within the rounded recesses 60 of the support membes 48 and 50. When the flanges 42 and 44 are 2-inch, 30 and 40 kilogram-force/square centimeter JIS flanges, the apparatus 40 is positioned as shown in FIG. 9, i.e., with the eight bolts or studs 43 of the flanges fitted partially within the rounded recesses 60 of the support members 48 and 50.

Figure 10:
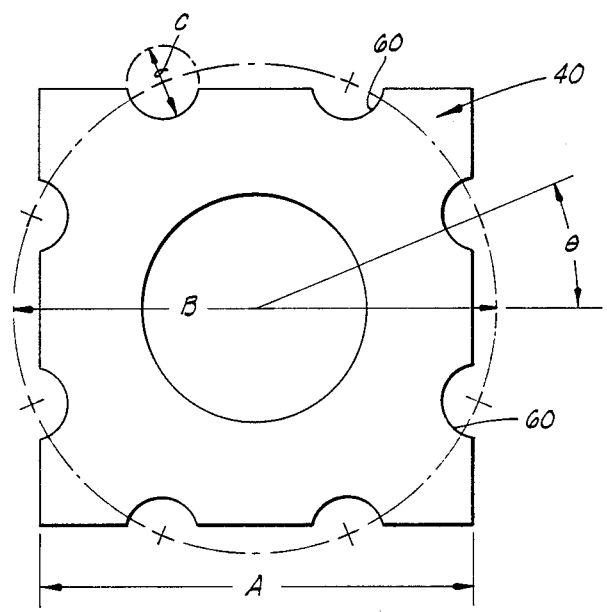
FIG. 10 is a side view of the apparatus of the present invention having certain dimensional indications shown thereon.

As will be understood, the structure supporting apparatus of the present invention can be comprised of only one support member having flat opposite parallel sides for sealingly engaging the seating surfaces of the flanges between which is it clamped, having a centrally positioned opening extending through the support member and through the flat parallel sides thereof for positioning structure supported by the support member in alignment with the centrally positioned flow passageways in the flanges and having a periphery of the configuration described above. Depending upon the particular nominal size of the structure supporting apparatus, the size as well as the depth of the rounded recesses in the sides of the apparatus vary. Referring to FIG. 10, the dimensions of the support member or members of the apparatus of the present invention for various nominal sizes of the apparatus are given in Table II below.

TABLE II

| | SUPPORT MEMBER DIMENSIONS | | | |
|---|---|---|---|---|
| Nominal Size of Apparatus | Dimension A | Dimension B | Dimension C | Angle O |
| 1" | 72.5 mm ± 5 mm | 79 mm ± 5 mm | 15 mm ± 5 mm | 22.5° ± 5° |
| 1¼" | 93.5 mm ± 5 mm | 100 mm ± 5 mm | 20 mm ± 5 mm | 22.5° ± 5° |
| 2" | 105 mm ± 5 mm | 120 mm ± 5 mm | 19 mm ± 5 mm | 22.5° ± 5° |
| 3" | 133 mm ± 5 mm | 157 mm ± 5 mm | 9 mm ± 5 mm | 22.5° ± 5° |
| 4" | 158 mm ± 5 mm | 186 mm ± 5 mm | 23 mm ± 5 mm | 22.5° ± 5° |

Thus, by the present invention, structure supporting apparatus is provided which can be interchangeably sealingly clamped and centered between bolted flanges of varying pressure rating and design standard. As indicated above, a preferred form of the structure supporting apparatus is comprised of at least one support member having flat opposite parallel sides for sealingly engaging the seating surfaces of the flanges, a centrally positioned opening extending through the support member and through the flat parallel sides thereof for positioning structure supported by the support member in alignment with the flow passageways of the flanges, the periphery of the support member being substantially square shaped and including a pair of spaced apart rounded recesses disposed in each of the four sides forming the substantially square shaped periphery thereof.

Figure 11:
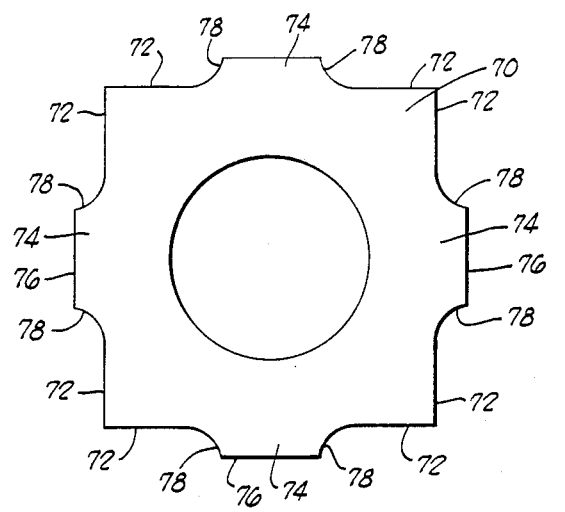
FIG. 11 illustrates an alternate peripheral shape of the apparatus of the present invention.
Figure 12:
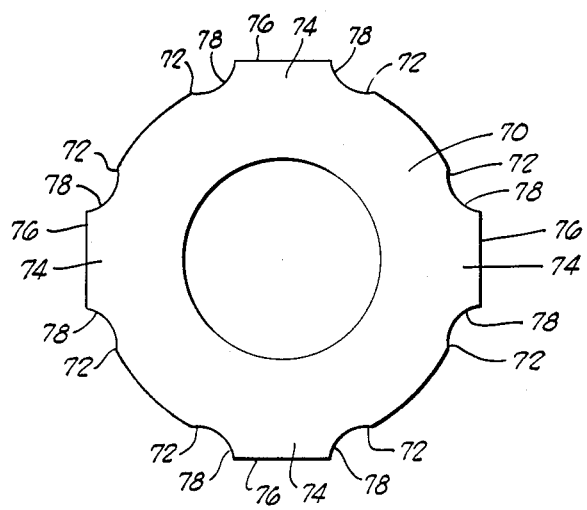
FIG. 12 illustrates another alternate peripheral shape of the apparatus of the present invention.
Figure 13:
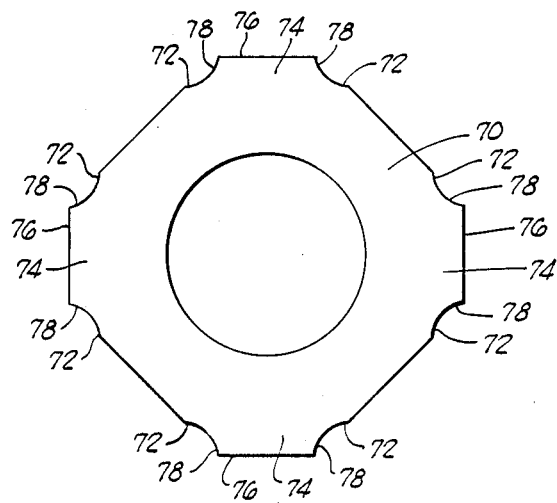
FIG. 13 illustrates yet another alternate peripheral shape of the apparatus of the present invention.

Referring to FIGS. 11-13, alternate peripheral configurations of the support member or members of the apparatus of the present invention are illustrated. Referring specifically to FIG. 11, the periphery of a support member 70 of the invention is substantially square shaped with a pair of spaced apart recesses 72 in each of the sides forming the square shape whereby four outwardly extending protuberances 74 are present. The exterior surfaces 76 of the protuberances 74 are flat and the sides 78 of each of the protuberances are rounded. That is, instead of a pair of circular recesses being formed in each of the sides of the support member 70 forming the square, the recesses 72 cut off the corner portions of the square thereby leaving the protuberances 74.

FIG. 12 illustrates an alternate embodiment similar to the embodiment shown in FIG. 11 except that the square corners of the support member 70 are rounded off. FIG. 13 illustrates yet another embodiment similar to the embodiment shown in FIG. 11 except that the square corners of the support member 70 are beveled.

As will be understood by those skilled in the art, when the structure supporting apparatus is utilized for supporting a rupture disk assembly or rupture disk, it can be comprised of one, two or more individual support members. When two or more support members are used, such as illustrated in FIGS. 3 and 4, the support members can be welded, bolted or otherwise attached together with the rupture disk or disks clamped therebetween. This is often desirable in that the assembly of the rupture disk or disks used and the supporting members can be accomplished at the factory and the support members protect the rupture disk or disks from damage during handling and installation. The rupture disk or disks used can take any of a variety of forms such as flat, domed reverse buckling (pressure exerted on the convex side of the disk), domed conventional burst (pressure exerted on the concave side), composite (two or more disks either alone or with other structure such as vacuum supports, etc.) and other known forms. In addition, other structure such as knife blades or other cutting means can be supported by the structure supporting apparatus. In operation of the pressure relief device 40 illustrated in FIGS. 3 and 4, one side of the rupture disk 40 46 is subjected to fluid pressure from a vessel or system to be protected by connecting one of the flanges 48 or 50 to the vessel or system. The other flange can be left open to the atmosphere or connected to a vessel or system for receiving relieved fluids. When the fluid pressure exerted on the rupture disk 46 reaches the design rupture pressure thereof, the disk 46 ruptures whereby the fluid pressure is relieved.

As stated above, the structure supporting apparatus of this invention can be utilized for supporting any of a great variety of structure between bolted flanges including, but not limited to, rupture disks and rupture disk assemblies, valves, instruments such as flow and temperature controls, etc. In addition, the structure supporting apparatus can be an integral part of the structure supported, such as the device shown in FIGS. 1 and 2, or the structure supported can be attached to a single support member, clamped between two or more support members, etc.

While numerous changes to the apparatus of this invention, including changes in the peripheral configuration of the support member or members of the apparatus, will suggest themselves to those skilled in the art, such change are encompassed within the spirit of this invention as defined by the appended claims.

What is claimed is:

1. Structure supporting apparatus which can be interchangeably sealingly clamped and centered between bolted flanges of varying pressure rating and design standard, said flanges including complementary flow passageways therein and annular seating surfaces thereon comprising at least one support member having opposite sides for sealingly engaging the seating surfaces of said flanges, a centrally positioned opening extending through said member and through said opposite sides thereof for positioning structure supported by said member in alignment with the flow passageways in said flanges and having a substantially square shaped periphery including a pair of spaced apart recesses disposed in each of the four sides forming the substantially square shaped periphery.

2. The apparatus of claim 1 wherein said support member opposite sides for sealingly engaging the seating surfaces of said flanges are flat.

3. The apparatus of claim 2 wherein said recesses are at least partially rounded.

4. The apparatus of claim 1 wherein said centrally positioned opening in said support member is circular.

5. Structure supporting apparatus which can be interchangeably sealingly clamped and centered between bolted flanges of varying pressure rating and design standard, the flanges including complementary flow passageways therein and annular seating surfaces thereon comprising a pair of identical support members adapted to have said structure supported therebetween, each having a flat side for sealingly engaging a seating surface of one of said flanges, a centrally positioned opening extending therethrough for positioning said structure supported by said support members in alignment with and across the flow passageways in said flanges and a substantially square shaped periphery including a pair of spaced apart recesses disposed in each of the four sides forming said substantially square shaped periphery.

6. The apparatus of claim 5 wherein said centrally positioned openings in said support members are circular.

7. The apparatus of claim 6 wherein said recesses are at least partially rounded.

8. The apparatus of claim 7 wherein the supported structure is comprised of a rupture disk.

9. Pressure relief apparatus which can be interchangeably sealingly clamped and centered between bolted flanges of varying pressure rating and design standard, the flanges including complementary flow passageways therein and annular seating surfaces thereon comprising:
   a rupture disk having a flange portion adapted to be clamped between support members; and
   a pair of complementary support members for clamping said rupture disk therebetween, each having flat parallel sides for sealingly engaging the seating surfaces of said flanges and the flange portion of said rupture disk, each having a centrally positioned opening extending through said support member and through the flat parallel sides thereof for positioning a portion of said rupture disk clamped by said support members in alignment with and across the flow passageways in said flanges and each having a substantially square shaped periphery including a pair of spaced apart rounded recesses in each of the four sides forming said substantially square shaped periphery.

10. The apparatus of claim 9 wherein said rupture disk is circular, the flange portion thereof is annular and the centrally positioned openings extending through said support members are circular.

11. The apparatus of claim 9 wherein the portion of said rupture disk positioned in alignmen.t with and across the flow passageways in said flanges is domed.

12. The apparatus of claim 9 wherein the periphery of each of said support members is of a shape which is substantially square and each of the sides forming said square includes a pair of spaced apart recesses which form an outwardly extending protuberance thereon.

* * * * *